United States Patent
Guenot et al.

(10) Patent No.: US 10,224,711 B2
(45) Date of Patent: Mar. 5, 2019

(54) DEVICE AND METHOD FOR PROTECTING AGAINST LEAKAGE CURRENTS

(71) Applicant: Zodiac Aero Electric, Montreuil (FR)

(72) Inventors: Stéphane Guenot, Antony (FR); Loic Aoustin, Conflans Sainte Honorine (FR); Jean-Clair Pradier, Houilles (FR)

(73) Assignee: Zodiac Aero Electric, Montreuil (FR)

( * ) Notice: Subject to any disclaimer, the term of this patent is extended or adjusted under 35 U.S.C. 154(b) by 0 days.

(21) Appl. No.: 14/323,155

(22) Filed: Jul. 3, 2014

(65) Prior Publication Data

US 2015/0009593 A1    Jan. 8, 2015

Related U.S. Application Data

(60) Provisional application No. 61/856,190, filed on Jul. 19, 2013.

(30) Foreign Application Priority Data

Jul. 4, 2013   (FR) ...................... 13 56556

(51) Int. Cl.
*H02H 9/08*      (2006.01)
*H01H 83/02*     (2006.01)
*H02H 9/04*      (2006.01)
*H02H 5/12*      (2006.01)

(52) U.S. Cl.
CPC .............. *H02H 9/08* (2013.01); *H01H 83/02* (2013.01); *H02H 5/12* (2013.01); *H02H 9/041* (2013.01)

(58) Field of Classification Search
CPC ............ H02H 5/12; H02H 9/041; H02H 9/08; H01H 83/02

USPC .......................................................... 361/42
See application file for complete search history.

(56) References Cited

U.S. PATENT DOCUMENTS

| | | | |
|---|---|---|---|
| 3,873,905 A | 3/1975 | Marek | |
| 4,806,844 A * | 2/1989 | Claydon | G05F 3/18 323/267 |
| 5,296,800 A * | 3/1994 | Bjorkman | G05F 1/563 323/268 |
| 5,784,236 A * | 7/1998 | Tardiff | H02H 9/04 361/111 |
| 7,538,454 B2 | 5/2009 | Yu | |
| 7,924,538 B2 | 4/2011 | Weinert | |
| 2003/0141918 A1* | 7/2003 | Uno | H02H 9/041 327/309 |

(Continued)

FOREIGN PATENT DOCUMENTS

WO    2010142646    12/2010

OTHER PUBLICATIONS

French search report for French patent application No. FR 1356556 dated Apr. 9, 2014.

*Primary Examiner* — Kevin J Comber
(74) *Attorney, Agent, or Firm* — Meyertons, Hood, Kivlin, Kowert & Goetzel, P.C.; Mark R. DeLuca

(57) ABSTRACT

Device for protecting against leakage currents, the device being intended to be wired up between a first electrical connection (2) and a second electrical connection (3).
The device comprises a switch (5) configured so as to at least partially divert the current flowing in the first electrical connection and controlled by the voltage of the first electrical connection.

16 Claims, 2 Drawing Sheets

(56) References Cited

U.S. PATENT DOCUMENTS

Figure 1:
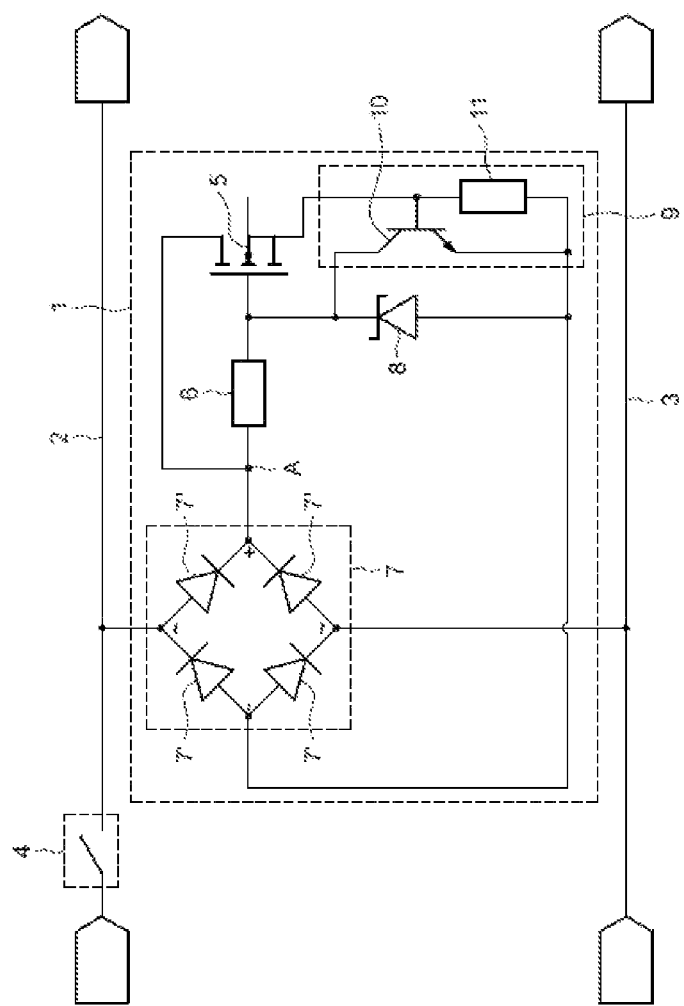

2006/0049818 A1* 3/2006 Montgomery ...... H02M 7/2176
                                                323/364
2012/0250205 A1* 10/2012 Pfitzer ................... H02H 9/041
                                                361/91.1

* cited by examiner

DEVICE AND METHOD FOR PROTECTING AGAINST LEAKAGE CURRENTS

The invention relates to protection against leakage currents and in particular devices for protecting against leakage currents which can be connected on an electrical line at the output of a power breaker.

In general, breakers are used to permit or halt the passage of the current between a source and a load to be powered. In the off state, the breakers are intended to support high voltages, for example of the order of several hundred volts, while limiting the occurrence of leakage currents. In the enabled state, the breakers are intended to allow high currents to pass, for example of the order of several hundred amperes, doing so while exhibiting a low voltage across the terminals of the breaker. In addition, breakers are chosen to allow fast switching, in order to reduce switching losses.

In particular, use is made of breakers comprising semiconducting power components, for example insulated gate bipolar transistors ("IGBTs"), MOSFET transistors, gate turn-off thyristors ("GTO thyristors"), bipolar transistors, Triacs, thyristors, or diodes. The use of such breakers can create stray capacitances. Therefore, in the off state, these breakers may allow a residual leakage current to pass. At the output of these breakers, a leakage current may give rise to a so-called contact voltage having a high value. Contact voltages may be dangerous in the case of contact between a user and a conducting portion in electrical communication with the output of the breaker.

It is therefore appropriate to limit contact voltages and therefore the leakage currents at the output of the breakers. The following standards which define the permitted limits of contact voltage and of leakage current may be consulted: IEC/TS 60479-1, IEC/TS 60479-2 and IEC60990 Rev 2. Below these limits, good protection of users against electrical risk is obtained.

It has been proposed to use devices for protecting against leakage currents, which therefore also protect against contact voltages.

It has for example been proposed to use a capacitor between the output of a breaker and the electrical earth to limit the AC leakage currents. This passive solution has the drawbacks of requiring a significant area, and of requiring, in particular, adaptation of the value of the capacitor for each type of breaker and for each application.

It has also been proposed to use electromechanical relays in series with a semi-conducting breaker, the electromechanical relays being controlled by the semi-conducting breaker control circuit. Even though this solution makes it possible to obtain perfect galvanic isolation and a protection which can operate even if the control circuit for the breaker and for the electromechanical relay no longer powers the breakers ("Fail-safe"), this solution has the drawbacks of requiring a significant area, a significant weight, of being very unreliable, and of having a significant cost.

Finally, the document WO 2007/006021 may be consulted. This document describes the use of a secondary breaker disposed between the output of a so-called primary breaker and the earth. The secondary breaker is controlled so as to form a short-circuit when the primary breaker is open. This secondary breaker is controlled by the primary breaker control circuit. The drawback of this solution is in particular in the creation of risks of destruction of the components related to the simultaneous closing of the two breakers. This solution also has the drawbacks of requiring a secondary breaker sized so as to be able to withstand a voltage rise due to lightning and of requiring a power supply in order to operate. In other words, this device is not "fail-safe" according to a terminology well known to the person skilled in the art denoting assured operation despite the failure of a component.

The aim of the invention is therefore to improve the protection against leakage currents and to obtain a compact and more dependable device.

According to one aspect of the invention, there is proposed a device for protecting against leakage currents, the device being intended to be connected between a first electrical connection and a second electrical connection.

The device comprises a switch configured so as to at least partially divert the current flowing in the first electrical connection and controlled by the voltage of the first electrical connection.

It is in particular possible to connect said device to the output of a breaker, for example a breaker likely to let through leakage currents. The first electrical connection then corresponds to the electrical line disposed after the breaker, the second electrical connection being able to correspond to the electrical neutral.

Whereas in the prior art use is made of devices controlled by voltages which originate from other electronic circuits which are themselves powered, here, it is the voltage level of the first connection which controls the opening and the closing of the switch. More precisely, if a voltage occurs on the first electrical connection, then it is possible to use this voltage to close said switch and to allow at least partial diversion of the current. In contradistinction to the prior art, it is possible not to use electromechanical relays or capacitors, and therefore a compact device is obtained.

Hence, by at least partially diverting the current, it is possible to have a protection device which operates provided that a voltage occurs on the first electrical connection, this voltage possibly being a supply voltage due to the closing of a breaker disposed upstream on the first electrical connection or to leakage currents giving rise to a voltage. Indeed, since the diverted current is limited, it is possible to obtain normal operation for a load which might be connected to the electrical connections.

The partial diversion of the current is different from the prior art solutions in which the electrical connection is directly earthed.

The switch can be configured so as to be closed when the voltage of the first electrical connection exceeds a threshold value.

It is in particular possible to fix this threshold value at 5 volts, so as to be able to comply with the above-mentioned standards relating to contact voltages. By partially diverting some current if the voltage exceeds 5 V it is possible to lower the voltage on the first electrical connection and obtain a voltage which is not dangerous to a user.

The switch can be a MOSFET transistor, for example a MOSFET with conduction channel of type N, the gate of the transistor being connected to the first electrical connection by means of a resistor, and the drain of the transistor is connected to the first connection.

Thus the drain and the gate of the transistor are connected through this resistor and the voltage of the first electrical connection makes it possible to control the transistor and to allow the passage of the current by simultaneously applying a gate voltage and a drain-source voltage.

The device can comprise a circuit for limiting the current flowing in the switch.

It is thus possible to have an always-on device, and it is possible to have a current which passes through the transistor of less for example than 6 milliamperes rms. The standards IEC/TS 60479-1 and IEC/TS 60479-2 are thus complied with. Protection against lightning strikes is then obtained since the current which flows through the device is limited.

The circuit for limiting the current can comprise a bipolar transistor and a limiting resistor, the collector of the bipolar transistor being connected to the gate of the MOSFET transistor and the base of the bipolar transistor being common to the limiting resistor and to the source of the MOSFET transistor.

Thus it is directly the voltage of the first electrical connection which will drive the switch, here a MOSFET transistor, and therefore also the bipolar transistor so as thereafter to limit the current passing through the switch. If the switch is a transistor, the limiting circuit makes it possible to lower the gate voltage of this transistor and therefore, by negative feedback, to limit the current which will flow through this transistor.

By way of example, the current can be limited by the ratio of the limiting resistance to the saturation base-emitter voltage of the bipolar transistor.

The switch can be configured so as to be closed and to at least partially divert the current flowing in the first electrical connection in a first mode of control of the device and to be open in a second mode of control of the device, the device furthermore comprising a resistor forming an input impedance of the device in the second mode of control.

The resistor forming an input impedance of the device can be for example the resistor disposed between the gate of the transistor forming the switch and the first electrical connection.

Whereas in the prior art there is a mode of control in which the device forms a short-circuit and another mode of control in which the device forms an open circuit, here, a resistor is used to greatly limit the diversion of current and to allow power to be supplied to a load connected to the electrical connections. By way of example, it is possible to use resistors having resistance values of the order of some hundred kilo-ohms, for example greater than 500 kilo-ohms.

The device can comprise an input configured so as to receive a control signal, the device being configured so as to be in the first mode of control when the voltage of the control signal is zero.

In addition to being controlled by the voltage of the first electrical connection, the device can be in the first mode of control automatically by using a control signal having a voltage equal to zero. If for example a microcontroller is used to choose the mode of control, then protection against leakage currents is obtained even though this microcontroller is defective or not powered. "Fail-safe" operation is therefore obtained.

The device can comprise an optocoupler connected to the said input configured so as to receive a control signal. The optocoupler can then be configured so as to be off in the first mode of control and on in the second mode of control.

When enabled, the optocoupler can for example short-circuit the control of the switch. Indeed if the switch is a transistor it is possible to short-circuit its gate to prevent it from opening if a voltage occurs on the first electrical connection, the device then exhibiting the said resistance as input impedance, thereby making it possible to power a load connected downstream to the electrical connections.

The device can comprise a rectifier circuit disposed at the input of the device and connected to the first and to the second electrical connection.

It is thus possible to deal with AC leakage currents. According to another aspect of the invention, there is proposed a method for protecting against leakage currents by means of the device such as defined hereinabove, in which a load is connected to the first and to the second electrical connection.

According to a general characteristic of the method, the device is controlled so that it operates in the first mode of control when the said load must not operate, and the device is controlled so that it operates in the second mode of control when the said load must operate.

Figure 2:
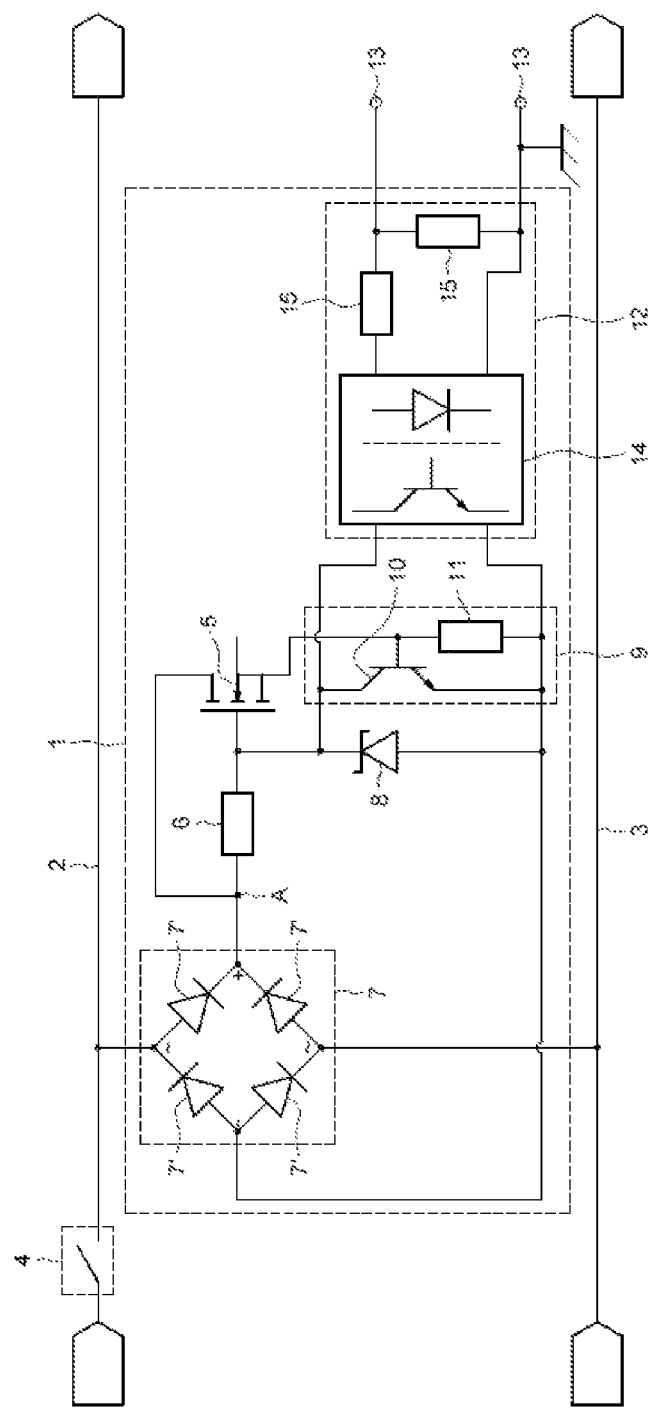

Other advantages and characteristics of the invention will become apparent on studying the following description, taken by way of nonlimiting example and illustrated by the appended drawings in which:

FIGS. 1 and 2 illustrate two variants of embodiments of the invention.

In FIG. 1 has been schematically represented a device 1 for protecting against leakage currents, which therefore makes it possible to prevent the occurrence of contact voltages. The device 1 is connected to a first electrical connection 2 and to a second electrical connection 3, the first electrical connection 2 being connected to the output of a breaker 4. The first electrical connection 2 can correspond to an electrical phase, and the second electrical connection 3 can correspond to the electrical neutral. The breaker 4 may be a breaker comprising semi-conducting components which allow leakage currents to pass because of their stray capacitances. The device 1 is therefore used to lower the output voltage of the breaker 4 so as to obtain voltages without risks for the users.

By way of indication, it is possible to use the device 1 for protecting against leakage currents in the wiring for a load which can be for example an electrical apparatus to be powered within an aircraft.

The device 1 comprises in particular a transistor 5 controlled so as to divert the current flowing in the first connection 2, for example a MOSFET transistor with conduction channel of type N. The drain and the gate of the transistor 5 are connected by means of the resistor 6 to the point A. Thus, during the occurrence of a voltage on the first electrical connection 2 there is simultaneously a rise in the drain-source voltage of the transistor 5 and in the gate voltage of this transistor. The transistor 5 is then controlled so as to divert current from the first electrical connection 2.

It is possible to choose a transistor 5 having a threshold voltage of less than 5 Volts, in order to divert the current, provided that the voltage on the first electrical connection 2 exceeds a threshold for example of 5 Volts. Indeed, limiting the contact voltage to 5 Volts makes it possible to greatly reduce the risk of physical hazard for any person who may be led to come into contact with the electrical connections 2 and 3.

The device 1 also comprises a rectifier bridge 7 disposed at the input of the device 1 and connected directly by one of its terminals to the first electrical connection 2 and to the electrical connection 3 as well as by another of its terminals to the point A. This rectifier bridge makes it possible to control the transistor so as to divert the AC leakage currents. The rectifier bridge 7 comprises four diodes 7' forming a rectifier bridge. It may be noted that the leakage currents diverted by the transistor 5 are redirected through the rectifier bridge 7 to the second electrical connection 3 which may be the neutral.

In order to protect the gate of the transistor 5, a diode 8 can be connected to this gate.

The device 1 comprises a circuit 9 for limiting the current flowing in the transistor 5. This limiting circuit comprises a bipolar transistor 10 and a resistor 11. By limiting the current passing through the transistor 5, it is possible to obtain a device 1 which operates permanently, in particular when the breaker 4 is closed and a load is powered by the first and second electrical connections 2 and 3. By limiting the current which is diverted in the device, the device experiences very low electrical stresses during lightning strikes for example.

The limitation obtained by the circuit 9 is implemented by controlling the transistor 10 so as to lower the gate voltage of the transistor 5. This limitation is implemented automatically when the base of the transistor 10 receives current from the transistor 5. Therefore, in addition to regulation by the voltage of the first electrical connection 2, regulation is obtained by the current which is diverted.

Although it is possible to use a device 1 which permanently diverts current, for example leakage currents from the first electrical connection 2, it is also possible to control the device 1 so that this diversion is implemented only when the breaker 4 is closed and therefore enabled.

In FIG. 2 has been represented in a schematic manner a variant according to the invention in which the device 1 is controllable. This control can for example stem from a microcontroller, not represented in this figure, which also controls the breaker 4.

In this variant, the device 1 comprises a control circuit 12 furnished with an input 13 configured so as to receive a control signal. The control circuit 12 comprises in particular an optocoupler 14 and resistors for adapting the voltage 15. The optocoupler 14 is connected to the remainder of the circuit of the device 1 by an electrical connection passing through the optocoupler, going on the one hand to the gate of the transistor 5 and on the other hand to a point of the rectifier circuit 7, intended to allow the currents to flow towards the second electrical connection 3.

When the control signal voltage received by the control circuit 12 is zero, the optocoupler 14 is not enabled, more precisely, the output of the optocoupler 14 is not enabled, and the device 1 operates like the device described while referring to FIG. 1: the leakage currents are diverted through the transistor 5 which is controlled by the voltage of the first electrical connection 2, and the current which passes through this transistor 5 is limited by the limiting circuit 9.

When the control signal voltage received by the control circuit 12 is positive, the electrical connection passing through the optocoupler 14 is enabled and the gate of the transistor 5 is short-circuited. The device 1 seen from the first electrical connection 2 then exhibits an input impedance corresponding to the resistor 6 and the device 1 is then not considered to be active: there is no diversion of current. It will be possible to choose a resistor 6 having a resistance value of the order of several hundred kilo-ohms, for example a value of greater than 500 kilo-ohms.

As indicated hereinabove, it is when the control signal is zero that the device 1 is considered to be active and that protection against leakage currents is obtained. "Fail-safe" operation is obtained, and will protect users against leakage currents even in the case of failure of a microcontroller that produces the control signal.

When the breaker 4 is closed, the device 1 can be rendered inactive by sending a non-zero signal to the control circuit 12.

Whereas in the prior art such control can present risks when so-called primary breaker is closed simultaneously with a so-called secondary breaker intended to divert the leakage currents, here, the use of a limiting circuit 9 makes it possible to prevent the occurrence of a short-circuit through the device 1 when a load must be powered by the electrical connections 2 and 3.

By virtue of the invention, better protection is obtained against leakage currents and therefore against the occurrence of contact voltages, and a device that is more dependable is obtained, in particular against the voltages occurring on account of lightning, and also in one embodiment against faults of an external apparatus controlling the protection device.

It may also be noted that by virtue of the invention, a compact device is obtained which can operate without electromechanical relays and without capacitors.

Finally, the invention can be adapted on any type of electrical connections, the sizing of the components being for example done so as to correspond to the standards for protecting users independently of the current which flows in the connections and of the load placed downstream.

The invention claimed is:

1. A device for protecting against leakage currents, the device being to be connected between a first electrical connection and a second electrical connection, the device comprising:
 a switch configured so as to at least partially divert a current flowing in the first electrical connection and controlled by a voltage of the first electrical connection;
 a circuit for limiting a current flowing in the switch, wherein the circuit for limiting the current flowing in the switch further reduces the voltage controlling the switch; and
 a rectifier circuit disposed at the input of the device and connected to the first and second electrical connection, and
 an optocoupler, connected to the input, configured so as to receive a control signal and configured so as to be off in a first mode of control and on in a second mode of control, wherein in the second mode of control the optocoupler is configured to short-circuit the gate of the MOSFET transistor;
 in which the switch is a MOSFET transistor, a gate of the transistor being connected to the rectifier circuit by means of a resistor, and a drain of the transistor being directly connected to the rectifier circuit.

2. The device according to claim 1, in which the switch is configured so as to be closed when the voltage of the first electrical connection exceeds a threshold value.

3. The device according to claim 2, wherein the threshold value is less than 5 volts.

4. The device according to claim 2, wherein the threshold value is 5 volts.

5. The device according to claim 1, wherein the circuit for limiting the current comprises a bipolar transistor and a limiting resistor, the collector of the bipolar transistor being connected to the gate of the MOSFET transistor and the base of the bipolar transistor being common to the limiting resistor and to the source of the MOSFET transistor.

6. The device according to claim 5, wherein the current passing through the MOSFET transistor is limited by the ratio of the limiting resistance to the saturation base-emitter voltage of the bipolar transistor so that said current does not exceed 6 milliamperes rms.

7. The device according to claim 1, wherein the switch is configured so as to be closed and to at least partially divert the current flowing in the first electrical connection in a first mode of control of the device and to be open in a second mode of control of the device, the device furthermore comprising a resistor forming an input impedance of the device in the second mode of control.

8. The device according to claim 7, comprising an input configured so as to receive a control signal, the device being configured so as to be in the first mode of control when the voltage of the control signal is zero.

9. A method for protecting against leakage currents by means of the device according to claim 7, in which a load is connected to the first electrical connection and to the second electrical connection, wherein the device is controlled so that it operates in the first mode of control when the said load must not operate, and the device is controlled so that it operates in the second mode of control when the said load must operate.

10. The device according to claim 7, wherein the resistor forming an input impedance is the resistor disposed between the gate of the MOSFET transistor and the first electrical connection.

11. The device according to claim 1, wherein the first electrical connection is connected to the output of a breaker.

12. The device according to claim 1, wherein the MOSFET transistor is connected to the rectifier circuit by a single resistor.

13. The device according to claim 1, wherein the first electrical connection is an electrical phase and the second electrical connection is an electrical neutral.

14. The device according to claim 1, wherein the resistor has a resistance value greater than 500 kilo-ohms.

15. The device according to claim 1, including the rectifier circuit coupled between an input of the device and an output of the device, the input of the device being coupled to the first electrical connection and the output of the device being coupled to the second electrical connection, wherein the rectifier circuit is further coupled to a terminal of the switch, and is configured to redirect current diverted by the switch to the second electrical connection.

16. An electrical apparatus to be powered in an aircraft including a device according to claim 1.

* * * * *